(12) United States Patent
Li et al.

(10) Patent No.: US 12,388,557 B1
(45) Date of Patent: Aug. 12, 2025

(54) DOWNLINK SIGNAL SYNCHRONIZATION METHOD AND SYSTEM

(71) Applicant: CHINA TELECOM CORPORATION LIMITED, Beijing (CN)

(72) Inventors: Qizheng Li, Beijing (CN); Dezhi Zhang, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/864,148

(22) PCT Filed: Nov. 22, 2022

(86) PCT No.: PCT/CN2022/133487
§ 371 (c)(1),
(2) Date: Nov. 8, 2024

(87) PCT Pub. No.: WO2023/216549
PCT Pub. Date: Nov. 16, 2023

(30) Foreign Application Priority Data

May 9, 2022 (CN) .......................... 202210498932.8

(51) Int. Cl.
*H04J 14/02* (2006.01)
(52) U.S. Cl.
CPC ...... *H04J 14/0227* (2013.01); *H04J 14/0282* (2013.01)
(58) Field of Classification Search
CPC .............. H04J 14/0227; H04J 14/0242; H04Q 11/0067; H04Q 2011/0064; H04Q 2011/0088; H04L 7/033
See application file for complete search history.

(56) References Cited

U.S. PATENT DOCUMENTS

| 6,895,189 B1 | 5/2005 | Bedrosian |
| 10,326,689 B2 * | 6/2019 | Liu .................. H04W 28/0226 |

(Continued)

FOREIGN PATENT DOCUMENTS

| CN | 105191340 A | 12/2015 |
| CN | 106937184 A | 7/2017 |

(Continued)

OTHER PUBLICATIONS

International Search Report for International Patent Application No. PCT/CN2022/133487.

*Primary Examiner* — Tanya T Motsinger
(74) *Attorney, Agent, or Firm* — Perilla Knox & Hildebrandt LLP; Kenneth A. Knox (57) ABSTRACT

A downlink signal synchronization method and system are described. The method is applied to a wavelength division multiplexing passive optical network, including: when an optical network unit (GNU) is in a running state, detecting whether the synchronization of downlink signals is lost, the downlink signals comprising a management channel signal and a data channel signal; when the synchronization of the management channel signal is lost and the data channel signal is normally synchronized, switching the ONU from the running state to a management channel synchronization loss sub-state; monitoring a first recovery time of the ONU for recovering management channel signal synchronization in the management channel synchronization loss sub-state; and if the first recovery time does not exceed a first preset time threshold and the data channel signal is still normally synchronized, returning the ONU from the management channel synchronization loss sub-state to the running state.

10 Claims, 2 Drawing Sheets

When an Optical Network Unit (ONU) is in an operation state, detect whether loss of downlink signal synchronization occurs, wherein a downlink signal comprises a management TC data path signal and a data path signal — S101

When loss of management TC data path signal synchronization occurs and data path signal synchronization is normal, switch, by the ONU, from the operation state to a loss of downstream synchronization in the management TC data path (MLODS) sub-state — S102

Monitor a first restoration time for the ONU in the MLODS sub-state to restore the management TC data path signal synchronization — S103

If the first restoration time does not exceed a first preset time threshold and the data path signal synchronization is still normal, return, by the ONU, from the MLODS sub-state to the operation state to continue working in the operation state — S104

(56) References Cited

U.S. PATENT DOCUMENTS

| | | | | |
|---|---|---|---|---|
| 10,547,921 | B2* | 1/2020 | Zhang | H04Q 11/0067 |
| 2005/0129401 | A1* | 6/2005 | Kim | H04J 14/0227 |
| | | | | 398/67 |
| 2011/0211827 | A1* | 9/2011 | Soto | H04J 14/0279 |
| | | | | 398/25 |
| 2011/0268435 | A1* | 11/2011 | Mizutani | H04L 45/243 |
| | | | | 398/5 |
| 2014/0016926 | A1* | 1/2014 | Soto | H04J 14/0275 |
| | | | | 398/16 |
| 2016/0006608 | A1* | 1/2016 | Khotimsky | H04L 41/0806 |
| | | | | 398/67 |
| 2016/0269105 | A1* | 9/2016 | Yoshida | H04B 10/032 |
| 2016/0344472 | A1* | 11/2016 | Geng | H04J 14/0282 |
| 2019/0387293 | A1* | 12/2019 | Hajduczenia | H04L 41/08 |
| 2020/0044733 | A1* | 2/2020 | Soto | H04J 14/0252 |
| 2021/0320743 | A1 | 10/2021 | Geng et al. | |
| 2024/0129651 | A1* | 4/2024 | Liu | H04J 3/1652 |
| 2025/0096903 | A1* | 3/2025 | Van Veen | H04B 10/60 |
| 2025/0120889 | A1* | 4/2025 | Abecassis Wolfovich | |
| | | | | A61K 8/9794 |
| 2025/0121205 | A1* | 4/2025 | Auger | A61N 5/0618 |

FOREIGN PATENT DOCUMENTS

| | | |
|---|---|---|
| CN | 108259118 A | 7/2018 |
| CN | 108990083 A | 12/2018 |
| CN | 108259118 B | 12/2019 |

\* cited by examiner

DOWNLINK SIGNAL SYNCHRONIZATION METHOD AND SYSTEM

CROSS REFERENCE TO RELATED APPLICATIONS

The present application is a 371 national phase application of International Application No. PCT/CN2022/133487, filed on Nov. 22, 2022, which is based on and claims priority to Chinese Patent Application No. 202210498932.8, filed on May 9, 2022, the contents of both of which are hereby incorporated by reference in their entireties herein.

TECHNICAL FIELD

Embodiments of the present disclosure relate to the technical field of passive optical networks and, in particular, to a method and system for synchronizing a downlink signal.

BACKGROUND

High-speed Passive Optical Network (PON) technologies that have been widely deployed and applied in the existing networks mainly adopt time division multiplexing Ethernet Passive Optical Network (EPON) or Gigabit-Capable PON (GPON) systems, which work on a single wavelength for both uplink transmission and downlink transmission, and perform transmission through a mechanism in which their own transmission times are allocated. Wavelength Division Multiplexing PONs (WDM-PONs) adopt Wavelength Division Multiplexing (WDM) technologies. A PON port of an Optical Line Terminal (OLT) device and an Optical Network Unit (ONU) device as a user side terminal each occupy a pair of wavelength channels point-to-point. The number of users that can be accessed is several times that of the traditional time division PON, which mainly provides network connections for government and enterprise customers, wireless bearers, etc. In particular, in the field of 5G fronthaul, the use of WDM-PON can save backbone optical fiber resources and reduce the installation, maintenance and operation costs and difficulties of the networks.

The ONU registration and activation process in the traditional PON involves ranging, slot allocation and other states due to characteristics of the time division multiplexing, which are not required in the WDM-PON based on the wavelength division multiplexing. In the existing ONU registration and activation process of the WDM-PON system, the basic framework follows the traditional PON. When an ONU activation state machine is in an operation state, the state machine only standardizes a state migration method for a case of loss of data path synchronization.

It should be noted that the information disclosed in the Background section above is only for enhancing the understanding of the background of the present disclosure, and thus may include information that does not constitute prior art known to those of ordinary skill in the art.

BRIEF SUMMARY

According to an aspect of the present disclosure, there is provided a method for synchronizing a downlink signal, which is applied to a wavelength division multiplexing passive optical network, and the method includes:

when an Optical Network Unit (ONU) is in an operation state, detecting whether loss of downlink signal synchronization occurs, wherein a downlink signal includes a management TC data path signal and a data path signal;

when loss of management TC data path signal synchronization occurs and data path signal synchronization is normal, switching, by the ONU, from the operation state to a loss of downstream synchronization in the management TC data path (MLODS) sub-state;

monitoring a first restoration time for the ONU in the MLODS sub-state to restore the management TC data path signal synchronization; and if the first restoration time does not exceed a first preset time threshold and the data path signal synchronization is still normal, returning, by the ONU, from the MLODS sub-state to the operation state to continue working in the operation state.

According to an aspect of the present disclosure, there is provided a computer-readable storage medium having a computer program stored thereon, which, when executed by a processor, implements the method for synchronizing the downlink signal described in any one of the above embodiments.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in and constitute a part of this specification, illustrate embodiments consistent with the present disclosure and, together with the description, serve to explain the principles of the present disclosure. Apparently, the drawings in the following description are only some embodiments of the present disclosure. For those of ordinary skill in the art, other drawings may be obtained based on these drawings without paying any creative effort.

DETAILED DESCRIPTION

Example embodiments will now be described more fully with reference to the accompanying drawings. However, the example embodiments can be implemented in a variety of forms and should not be construed as being limited to examples set forth herein; rather, these embodiments are provided so that the present disclosure will be more complete and comprehensive so as to convey the idea of the example embodiments to those skilled in this art. The described features, structures or characteristics may be combined in any suitable manner in one or more embodiments. In the following description, many specific details are provided to give a full understanding of the embodiments of the present disclosure. However, those skilled in the art will appreciate that the technical solution of the present disclosure may be practiced without one or more of the specific details, or other methods, components, apparatuses, steps, and the like may be employed. In other instances, wellknown technical solutions are not shown or described in detail to avoid obscuring various aspects of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

In a Wavelength Division Multiplexing Passive Optical Network (WDM-PON), a user data path and a management TC data path are separated in a transmission convergence layer and pass through the transmission convergence layer. User data is not processed by the TC layer, while management data is processed by the TC layer in a specific manner, and a transmission mode of the TC layer is divided into two modes: a transcoded mode and a transparent mode. Therefore, in an ONU registration and activation process of the WDM-PON, embodiments of the present disclosure mainly include the following states: an initial state, a serial number state, an operation state, and an intermittent LODS state.

The initial state (O1) may be that: when the ONU is powered on for the first time or restarted, the ONU enters the initial state (O1), and in the initial state (O1), the ONU can perform operations of turning on a receiver and turning off a transmitter. The initial state (O1) may also include an Off-Sync sub-state (O1.1) and a profile learning sub-state (O1.2). The Off-Sync sub-state (O1.1) may be an entrance to the initial state (O1), and may be entered when the ONU attempts to perform synchronization on a PON wavelength channel. The profile learning sub-state (O1.2) may be used for the ONU to obtain profile information through a downlink PLOAM message to determine whether a wavelength channel is available. Once it is determined that the downlink synchronization of the wavelength channel is successful, the ONU may enter the profile learning sub-state (O1. 2).

The serial number state (O2-3) may be a transmitter activated by the ONU. The serial number state (O2-3) may be used for the ONU to periodically send a specific Physical Layer Operations, Administration and Maintenance (PLOAM) message and provide authentication information, until the OLT CT confirms the allocation of ONU-ID. When a time for which the ONU is in the serial number state (O2-3) times out, the ONU can return from the serial number state (O2-3) to the initial state (O1).

The operation state (O5) may be used for the ONU to receive and send signals through the PON path. In some embodiments of the present disclosure, the operation state (O5) may also include a loss of downlink synchronization in the management TC data path (MLODS) sub-state (O5.1, also referred to as O5.3). Specifically, when the ONU is in the operation state (O5), the data path signal synchronization is normal, but loss of the management TC data path signal synchronization occurs, then the ONU enters the MLODS sub-state (O5.3). After entering the MLODS sub-state (O5.3), the ONU can start a timer TO1 (also called TOM). The timer TO1 records a time that the ONU is in the MLODS sub-state (O5.3). If the ONU restores the management TC data path signal synchronization before TO1 times out, the ONU returns to the operation state (O5). If TO1 times out, the ONU will stop data transmission and enter the intermittent LODS state (O6).

The intermittent LODS state (O6) may be after the operation state (O5). That is, when the ONU in the operation state (O5) experiences the loss of the data path signal synchronization or a time for which the ONU is in the MLODS sub-state (O5.3) times out, the ONU enters the intermittent LODS state (O6). The intermittent loss of downstream synchronization may be referred to as the intermittent LODS state for short.

Specifically, after the ONU is accessed and powered on, it enters the initial state (O1) and starts the ONU activation, that is, the ONU tunes its receiver, searches for a wavelength of a downlink path, synchronizes with the data and management TC data paths, collects profile information, and confirms a basic parameter. After the ONU determines the wavelength of the downlink path, the ONU tunes the transmitter and declares its existence and authenticates through a specific message. After the OLT CT successfully authenticates the ONU, the confirmation will be performed through the specific message, and till now, the ONU enters the operation state (O5). When the ONU in the operation state (O5) experiences the loss of downlink synchronization, the ONU will enter the intermittent LODS state (O6). In the intermittent LODS state (O6), it can be detected whether a time required to restore the data path signal synchronization and the management TC data path signal synchronization is less than a preset threshold. If the required time is less than the preset threshold, that is, the ONU successfully restores the data path signal synchronization and the management TC data path signal synchronization within the preset threshold, then the ONU can return to the operation state (O5). If the required time is greater than the preset threshold, that is, the ONU fails to restore the data path signal synchronization and the management TC data path signal synchronization within the preset threshold, then the ONU can return to the Off-Sync sub-state (O1.1) in the initial state (O1) for reactivation. When the ONU in the operation state (O5) experiences the loss of downlink synchronization in the management TC data path, while the reception and transmission in the data path are still normal, there is no corresponding state migration method in the related arts, which may cause the ONU to be out of control.

Figure 1:
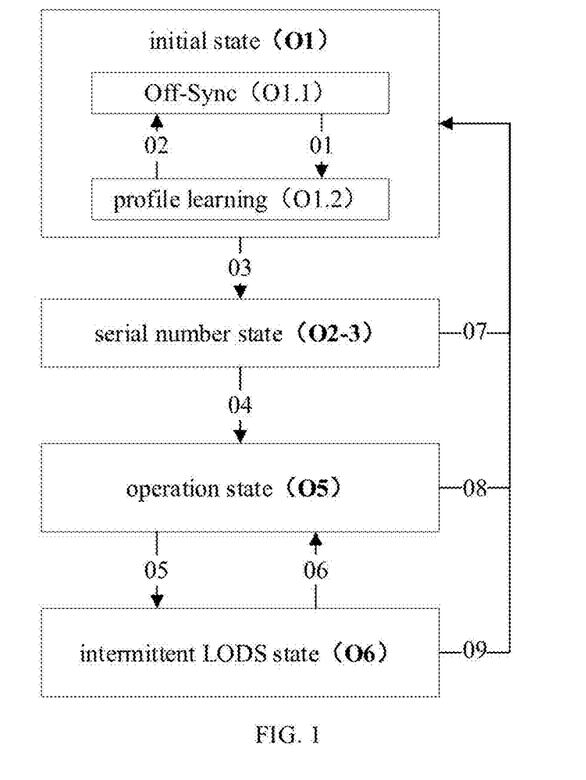
FIG. 1 is an ONU registration and activation process of a wavelength division multiplexing passive optical network system in the related art.

FIG. 1 is an ONU registration and activation process of a wavelength division multiplexing passive optical network in the related art. As shown in FIG. 1, in 01, when downlink signal synchronization restoration (DSYNC) occurs, that is, the data path signal synchronization and the management TC data path signal synchronization are restored, an ONU in an Off-Sync sub-state (O1.1) enters a profile learning sub-state (O1.2); in 02, when the LODS occurs or a downlink wavelength channel (DWLCH) is not compatible, the ONU in the profile learning sub-state (O1.2) enters the Off-Sync sub-state (O1.1); in 03, when the DWLCH can operate normally, the ONU in the initial state (O1) enters the serial number state (O2-3); in 04, when the allocation of ONU-ID is performed, the ONU in the serial number state (O2-3) enters the operation state (O5); in 05, when the loss of downlink synchronization (LODS) occurs, the ONU in the operation state (O5) enters the intermittent LODS state (O6); in 06, when the downlink signal synchronization restoration (DSYNC) occurs, that is, the data path signal synchronization and the management TC data path signal synchronization restore, the ONU in the intermittent LODS state (O6) enters the operation state (O5); in 07, when any of the following situations occurs: the loss of downlink synchronization, a stay time in the serial number state (O2-3) times out, or the ONU-ID request is released, the ONU in the serial number state (O2-3) enters the Off-Sync sub-state (O1.1); in

08, when a situation where the ONU-ID request is released occurs, the ONU in the operation state (O5) enters the Off-Sync sub-state (O1.1); in 09, if the stay time for which the ONU is in the intermittent LODS state (O6) times out, the ONU in the intermittent LODS state (O6) enters the Off-Sync sub-state (O1.1).

Figure 2:
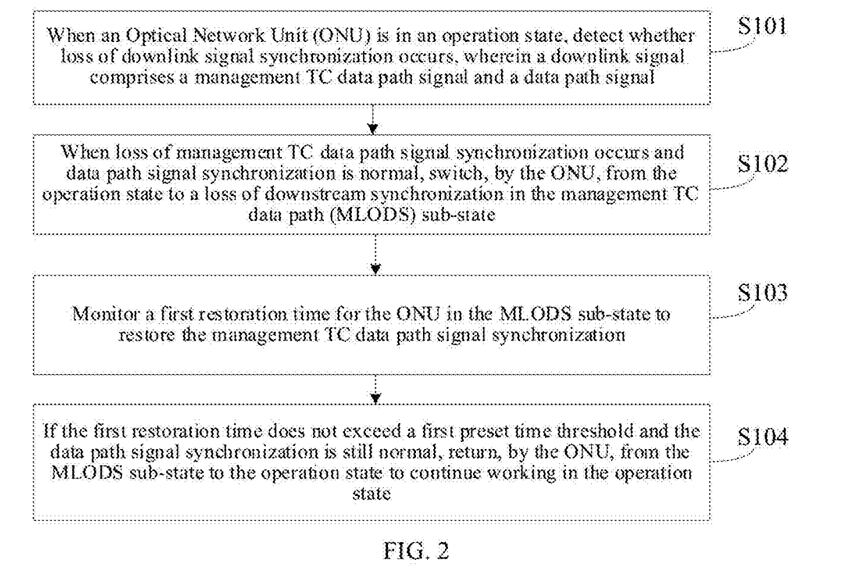
FIG. 2 is a flowchart of steps of a method for synchronizing a downlink signal provided in some embodiments of the present disclosure.

FIG. 2 is a flowchart of steps of a method for synchronizing a downlink signal provided by an embodiment of the present disclosure, which is applied to a wavelength division multiplexing passive optical network. As shown in FIG. 2, the method may include steps S101 to S104.

In the step S101, when an Optical Network Unit (ONU) is in an operation state, it is detected whether loss of downlink signal synchronization occurs, and a downlink signal includes a management TC data path signal and a data path signal.

In some embodiments of the present disclosure, the ONU may reach the operation state through the ONU registration and activation process. In the operation state, it is necessary to synchronize the downlink signal. During the synchronization process, the loss of the management TC data path signal synchronization may occur, or the loss of the data path signal synchronization may occur, or both the loss of the management TC data path signal synchronization and the loss of the data path signal synchronization may occur. Therefore, by detecting whether the loss of downlink signal synchronization occurs, the problem of the loss of signal synchronization can be solved in time to avoid the problem of the out of control of the ONU due to the loss of signal synchronization.

In the step S102, when loss of the management TC data path signal synchronization occurs and data path signal synchronization is normal, the ONU switches from the operation state to a loss of downstream synchronization in the management TC data path (MLODS) sub-state.

In some embodiments of the present disclosure, since the ONU is currently in the operation state, when the loss of the management TC data path signal synchronization occurs and the data path signal synchronization is normal, the ONU can enter the loss of downstream synchronization in the management TC data path (MLODS) sub-state from the operation state. The loss of downstream synchronization in the management TC data path (MLODS) sub-state can be referred to as the MLODS sub-state for short. In the MLODS sub-state, the data path synchronization of the ONU is normal, that is, user data can be sent and received normally, without being affected by the MLODS sub-state.

In the step S103, a first restoration time for the ONU in the MLODS sub-state to restore the management TC data path signal synchronization is monitored.

In some embodiments of the present disclosure, when the ONU is in the MLODS sub-state, a time for restoring the synchronization in the management TC data path signal can be recorded to obtain the first restoration time, and whether the first restoration time exceeds a first preset time threshold can be monitored in real time. The first restoration time may be a time for recording the ONU in the MLODS sub-state, and the first time threshold can be preset according to actual conditions, and is used to limit a time for the ONU to stay in the MLODS sub-state to try to restore the synchronization of the management TC data path, so as to avoid the problem that the ONU is out of control in the MLODS sub-state due to the too long of the MLODS state. It should be noted that when the ONU is in the MLODS sub-state, only the synchronization in the management TC data path signal fails, but the synchronization in the data path signal is normal, and accordingly, in the MLODS sub-state, the data path can still operate normally, that is, the transmission and reception of the user data can still operate normally.

In some embodiments, the ONU starts a first timer (such as the TOM in the aforementioned embodiments), and a duration of the first timer is configured as a first preset time threshold. The ONU determines whether the first timer times out when the synchronization in the management TC data path signal is restored, so as to determine whether the first restoration time for the ONU in the MLODS sub-state to restore the synchronization in the management TC data path signal exceeds the first preset time threshold.

In the step S104, if the first restoration time does not exceed a first preset time threshold and the data path signal synchronization is still normal, the ONU returns from the MLODS sub-state to the operation state to continue working in the operation state.

In some embodiments of the present disclosure, if the first restoration time does not exceed the first preset time threshold, that is, the synchronization in the management TC data path signal restores within the first preset time threshold and the synchronization in the data path signal is still normal, the ONU can be enabled to return from the MLODS sub-state to the operation state, so that the ONU can continue working normally in the operation state and perform normal sending and receiving operations on the downlink signal.

In summary, the method for synchronizing the downlink signal provided by embodiments of the present disclosure is applied to the wavelength division multiplexing passive optical network. When the ONU is in the operation state, it can be detected whether the loss of the downlink signal synchronization occurs, and the downlink signal includes the management TC data path signal and the data path signal. When the loss of the management TC data path signal synchronization occurs and the data path signal synchronization is normal, the ONU switches from the operation state to the MLODS sub-state. The first restoration time for the ONU in the MLODS sub-state to restore the synchronization in the management TC data path signal is monitored. If the first restoration time does not exceed the first preset time threshold and the data path signal synchronization is still normal, the ONU returns from the MLODS sub-state to the operation state to continue to normally work in the operation state. In this way, by introducing the sub-state in which only the loss of the downstream synchronization in the management TC data path occurs into the operation state, a situation where the loss of the management TC data path signal synchronization is not considered in the existing ONU registration and activation state mechanism is made up, and the problem that the ONU is out of control due to the absence of the state migration manner for the corresponding situation in the original state machine.

In some embodiments, the method further includes: after the first restoration time for the ONU in the MLODS sub-state to restore the management TC data path signal synchronization is monitored, if loss of the data path signal synchronization occurs within the first preset time threshold, the ONU switches from the MLODS sub-state to an intermittent loss of downstream synchronization (LODS) state.

In some embodiments of the present disclosure, when the ONU is in the MLODS sub-state, the loss of the data path signal synchronization may occur, that is, the loss of the data path signal synchronization occurs within the first preset time threshold. Since both the data path signal synchronization and the management TC data path signal synchronization of the ONU are lost, the ONU may directly switch to the intermittent LODS state and try to restore the downlink signal synchronization.

In some embodiments, the method further includes: after the first restoration time for the ONU in the MLODS sub-state to restore the management TC data path signal synchronization is monitored, if the first restoration time exceeds the first preset time threshold, the ONU is enabled to switch from the MLODS sub-state to the intermittent LODS state.

In some embodiments of the present disclosure, the first restoration time for restoring the management TC data path signal synchronization may exceed the first preset time threshold, that is, the management TC data path signal synchronization is not restored within the first preset time threshold, and then the ONU is enabled to return from the MLODS sub-state to the intermittent LODS state, so that the ONU can attempt to restore the downlink signal synchronization in the intermittent LODS state.

In some embodiments, the method for synchronizing the downlink signal in embodiments of the present disclosure further includes: when the ONU is in the intermittent LODS state, a second restoration time of the management TC data path signal and the data path signal of is monitored; if the second restoration time does not exceed a second preset time threshold, the ONU is enabled to return to the operation state to continue working; and if the second restoration time exceeds the second preset time threshold, the ONU enters an initial state in which the downlink signal is in synchronization.

In some embodiments of the present disclosure, for the ONU in the intermittent LODS state, a time for the ONU to restore the management TC data path signal and the data path signal may be recorded to obtain the second restoration time, and the second restoration time may be detected to determine whether the second restoration time exceeds a second preset time threshold. The second restoration time may be a time that the ONU is in the intermittent LODS state, and the second preset time threshold may be a time for limiting the ONU to stay in the LODS state, and the specific value may be set according to actual conditions.

In some embodiments, the ONU starts a second timer (TOL), and a duration of the second timer is configured as the second preset time threshold. The ONU determines whether the second timer times out when the management TC data path signal and the data path signal are restored, so as to determine whether the second restoration time for the ONU in the intermittent LODS state to restore the management TC data path signal and the data path signal exceeds the second preset time threshold.

In some embodiments of the present disclosure, if the second restoration time does not exceed the second preset time threshold, that is, the management TC data path signal synchronization and the data path signal synchronization of the ONU are successfully restored within the second preset time threshold, then the ONU can return from the intermittent LODS state to the operation state to continue to work normally. If the second restoration time exceeds the second preset time threshold, that is, the management TC data path signal synchronization and the data path signal synchronization of the ONU are not restored within the second preset time threshold, then the ONU can directly enter the initial state in which the downlink signal is in synchronization.

Figure 3:
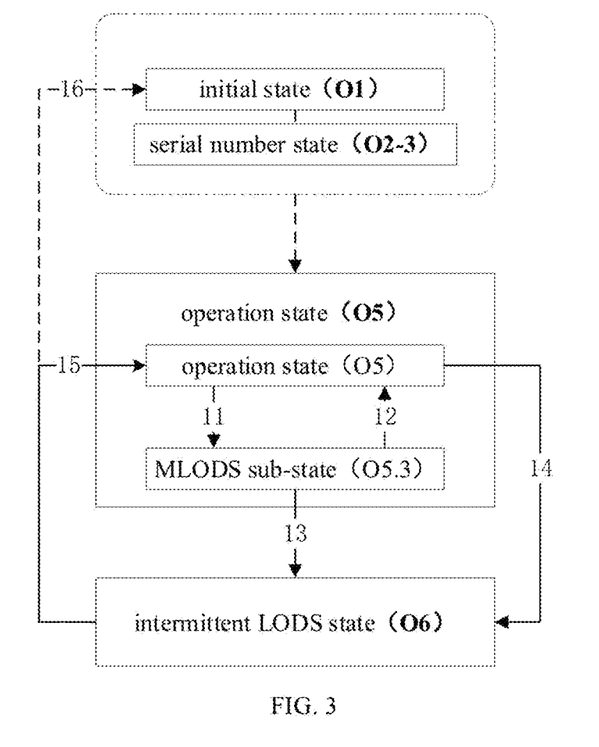
FIG. 3 is a flowchart of an ONU synchronization restoration provided in some embodiments of the present disclosure.

For example, FIG. 3 is a flowchart of ONU synchronization restoration provided by an embodiment of the present disclosure. As shown in FIG. 3, in 11, when the loss of the downstream synchronization in the management TC data path occurs, and the data path operates normally, the ONU in the operation state (O5) enters the MLODS sub-state (O5.3) and tries to restore the synchronization within a certain period of time, and in this case, transmission and reception of user data are still carried out normally and will not be affected; in 12, when the management TC data path signal synchronization is restored successfully, and the data path signal synchronization still works normally, the ONU in the MLODS sub-state (O5.3) returns to the operation state (O5); in 13, when the restoration of the management TC data path synchronization exceeds the second preset time threshold, or the loss of the data path synchronization occurs within the second preset time threshold, the ONU in the MLODS sub-state (O5.3) enters the intermittent LODS state (O6) to restore the data path synchronization; in 14, when the loss of downlink synchronization occurs, the ONU in the operation state (O5) directly enters the intermittent LODS state (O6) to restore the data path synchronization, since the normal transmission and reception of the user data cannot be guaranteed in this case; and in 15, when the synchronization of the data path and the synchronization of the management TC data path are successfully restored, the ONU in the intermittent LODS state (O6) returns to the operation state (O5).

TABLE 1

| event | Operation state O5 | MLODS state O5.3 | LODS state O6 |
|---|---|---|---|
| MLODS | Start a first preset time threshold →O5.3; | not applicable | not applicable |
| MDSYNC (Management TC data path Synchronization Restoration) | not applicable | Stop the first preset time threshold; →O5; | not applicable |
| LODS | Start a second preset time threshold; →O6; | Start the second preset time threshold; →O6; | not applicable |
| DSYNC (Downlink Synchronization Restoration) | not applicable | not applicable | Stop the second preset time threshold →O5; |
| The first preset time threshold times out | not applicable | Start the second preset time threshold; →O6; | not applicable |
| The second preset time threshold times out | not applicable | not applicable | (discard the ONU-ID value) →O1.1 (i.e. reactivate); |

For example, Table 1 represents an event that can be used for state migration in embodiments of the present disclosure. If the loss of the management TC data path signal synchronization occurs when the ONU is in the operation state O5, the first preset time threshold is started, and the MLODS sub-state is switched to, while the MLODS state O5.3 and the LODS state O6 are not applicable to the MLODS sub-state; in the MLODS state O5.3, if the management TC data path synchronization restoration (MDSYNC) occurs, the first preset time threshold can be stopped and the operation state O5 is switched to, while the operation state O5 and the LODS state O6 are not applicable to MDSYNC; in the MLODS state O5.3, if the LODS occurs, that is, the data path signal synchronization is lost, then the second preset time threshold can be started, and the LODS state O6 is switched to, and the LODS state O6 is not applicable to the LODS; the downlink synchronization restoration (DSYNC) is not applicable to the operation state O5 and the MLODS state O5.3; in the LODS state O6, if the DSYNC occurs, the second preset time threshold can be stopped, and the operation state O5 is switched to; in the MLODS state O5.3, if the first preset time threshold times out, the second preset time threshold can be started and the LODS state O6 is switched to, while the timeout of the first preset time threshold is not applicable to the operation state O5 and the LODS state O6; and in the LODS state O6, if the second preset time threshold times out, the ONU-ID value can be discarded, and the Off-Sync O1.1 is switched to (i.e., reactivated).

Figure 4:
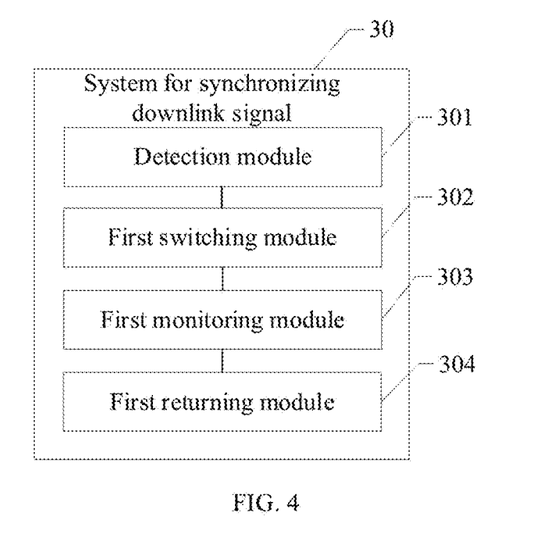
FIG. 4 is a block diagram of a system for synchronizing a downlink signal provided in some embodiments of the present disclosure.

FIG. 4 is a system for synchronizing a downlink signal provided by an embodiment of the present disclosure. As shown in FIG. 4, a system 30 may include: a detection module 301, a first switching module 302, a first monitoring module 303, and a first returning module 304.

The detection module 301 is configured to, when an Optical Network Unit (ONU) is in an operation state, detect whether loss of downlink signal synchronization occurs, wherein a downlink signal includes a management TC data path signal and a data path signal.

The first switching module 302 is configured to, when loss of management TC data path signal synchronization occurs and data path signal synchronization is normal, enable the ONU to switch from the operation state to a loss of downstream synchronization in the management TC data path (MLODS) sub-state.

The first monitoring module 303 is configured to monitor a first restoration time for the ONU in the MLODS sub-state to restore the management TC data path signal synchronization.

The first returning module 304 is configured to, if the first restoration time does not exceed a first preset time threshold and the data path signal synchronization is still normal, enable the ONU to return from the MLODS sub-state to the operation state to continue working in the operation state.

In summary, the system for synchronizing the downlink signal provided by embodiments of the present disclosure is applied to the wavelength division multiplexing passive optical network. When the ONU is in the operation state, it can be detected whether the loss of the downlink signal synchronization occurs, and the downlink signal includes the management TC data path signal and the data path signal. When the loss of the management TC data path signal synchronization occurs and the data path signal synchronization is normal, the ONU switches from the operation state to the MLODS sub-state. The first restoration time for the ONU in the MLODS sub-state to restore the synchronization in the management TC data path signal is monitored. If the first restoration time does not exceed the first preset time threshold and the data path signal synchronization is still normal, the ONU returns from the MLODS sub-state to the operation state to continue to normally work in the operation state. In this way, by introducing the sub-state in which only the loss of the downstream synchronization in the management TC data path occurs into the operation state, a situation where the loss of the management TC data path signal synchronization is not considered in the existing ONU registration and activation state mechanism is made up, and the problem that the ONU is out of control due to the absence of the state migration manner for the corresponding situation in the original state machine.

In some embodiments, the system 30 further includes: a second switching module, configured to, if loss of the data path signal synchronization occurs within the first preset time threshold, enable the ONU to switch from the MLODS sub-state to an intermittent loss of downstream synchronization (LODS) state.

In some embodiments, the system 30 further includes: a second switching module, configured to, if the first restoration time exceeds the first preset time threshold, enable the ONU to switch from the MLODS sub-state to an intermittent LODS state.

In some embodiments, the system 30 further includes: a second monitoring module, configured to, when the ONU is in the intermittent LODS state, monitor a second restoration time of the management TC data path signal and the data path signal; if the second restoration time does not exceed a second preset time threshold, enable the ONU to return to the operation state to continue working; and if the second restoration time exceeds the second preset time threshold, enable the ONU to enter an initial state in which the downlink signal is in synchronization.

In some embodiments, the data path signal synchronization of the ONU operates normally in the MLODS sub-state. The specific details of each module in the system for synchronizing the downlink signal have been described in detail in the corresponding method for synchronizing the downlink signal, which will not be repeated here.

It should be noted that although several modules or units of devices for executing actions are mentioned in the above detailed description, such division of modules or units is not mandatory. In fact, features and functions of two or more of the modules or units described above may be embodied in one module or unit in accordance with the embodiments of the present disclosure. Alternatively, the features and functions of one module or unit described above may be further divided into multiple modules or units.

In addition, although the various steps of the method of the present disclosure are described in a particular order in the figures, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

In an embodiment of the present disclosure, there is also provided an electronic device capable of implementing the above method.

Those of ordinary skill in the art will understand that embodiments of the present disclosure may be implemented as a system, method, or program product. Therefore, various embodiments of the present disclosure may be embodied in the form of an entire hardware implementation, an entire software implementation (including firmware, microcode, etc.), or an implementation combining hardware and software, which can be collectively referred to "circuit", "module", or "system" herein.

Through the foregoing description of the embodiments, those skilled in the art can easily understand that the exemplary embodiments described herein can be implemented by software, and can also be implemented by software in combination with necessary hardware. Therefore, the technical solutions according to the embodiments of the present disclosure can be embodied in the form of a software product that can be stored in a non-volatile storage medium (which may be a CD-ROM, U disk, mobile hard disk, etc.) or on a network. The software product may include several instructions to enable a computing device (which may be a personal computer, a server, a terminal device, or a network device, etc.) to perform a method according to an embodiment of the present disclosure.

In an embodiment of the present disclosure, there is also provided a computer-readable storage medium on which a program product capable of implementing the method described above in this specification is stored. In some possible implementations, various embodiments of the present disclosure may also be implemented in the form of a program product including a program code for causing the terminal device to perform the blocks according to various exemplary embodiments of the present disclosure described in the above exemplary method section of the present specification when the program product is executed on the terminal device.

The program product for implementing the above method according to embodiments of the present disclosure may take the form of a portable Compact Disc Read-Only Memory (CD-ROM) and include program codes, and may be run on a terminal device, such as a personal computer. However, the program product of the present disclosure is not limited thereto. The readable storage medium herein may be any tangible medium containing or storing a program, and the program may be used by an instruction execution system, an apparatus, or a device, or the program may be used in combination with the instruction execution system, the apparatus, or the device.

The program product may be any combination of one or more readable mediums. The readable medium may be a readable signal medium or a readable storage medium. The readable storage medium may be, for example, but is not limited to, electronic, magnetic, optical, electromagnetic, infrared, or a semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure may be written in any combination of one or more programming languages, which include object-oriented programming languages, such as Java, C++, and so on. The programming languages also include conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

In addition, the above drawings are merely schematic descriptions of processes included in the methods according to embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in a plurality of modules, for example.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A method for synchronizing a downlink signal, applied to a wavelength division multiplexing passive optical network, and comprising:
   when an Optical Network Unit (ONU) is in an operation state, detecting whether loss of downlink signal synchronization occurs, wherein a downlink signal comprises a management TC data path signal and a data path signal;
   when loss of management TC data path signal synchronization occurs and data path signal synchronization is normal, switching, by the ONU, from the operation state to a loss of downstream synchronization in the management TC data path (MLODS) sub-state;
   monitoring a first restoration time for the ONU in the MLODS sub-state to restore the management TC data path signal synchronization; and
   if the first restoration time does not exceed a first preset time threshold and the data path signal synchronization is still normal, returning, by the ONU, from the MLODS sub-state to the operation state to continue working in the operation state.

2. The method according to claim 1, further comprising: after monitoring the first restoration time for the ONU in the MLODS sub-state to restore the management TC data path signal synchronization, if loss of the data path signal synchronization occurs within the first preset time threshold, switching, by the ONU, from the MLODS sub-state to an intermittent loss of downstream synchronization (LODS) state.

3. The method according to claim 1, further comprising: after monitoring the first restoration time for the ONU in the MLODS sub-state to restore the management TC data path signal synchronization, if the first restoration time exceeds the first preset time threshold, enabling the ONU to switch from the MLODS sub-state to an intermittent LODS state.

4. The method according to claim 2, further comprising:
   when the ONU is in the intermittent LODS state, monitoring a second restoration time of the management TC data path signal and the data path signal; and
   if the second restoration time does not exceed a second preset time threshold, returning, by the ONU, to the operation state to continue working.

5. The method according to claim 4, further comprising:
if the second restoration time exceeds the second preset time threshold, entering, by the ONU, an initial state in which the downlink signal is in synchronization.

6. The method according to claim 1, wherein the data path signal synchronization of the ONU operates normally in the MLODS sub-state.

7. The method according to claim 1, wherein monitoring the first restoration time for the ONU in the MLODS sub-state to restore the management TC data path signal synchronization comprises:
starting, by the ONU, a first timer, wherein a duration of the first timer is configured as the first preset time threshold; and
determining, by the ONU, whether the first timer times out when the management TC data path signal synchronization is restored, to determine whether the first restoration time for the ONU in the MLODS sub-state to restore the management TC data path signal synchronization exceeds the first preset time threshold.

8. The method according to claim 4, wherein when the ONU is in the intermittent LODS state, monitoring the second restoration time of the management TC data path signal and the data path signal comprises:
starting, by the ONU, a second timer, wherein a duration of the second timer is configured as the second preset time threshold; and
determining, by the ONU, whether the second timer times out when the management TC data path signal and the date path signal are restored, to determine whether the second restoration time of the management TC data path signal and the date path signal when the ONU is in the intermittent LODS state exceeds the second preset time threshold.

9. An apparatus for synchronizing a downlink signal, comprising:
a processor; and
a memory, coupled to the processor and configured to store instructions, which, when executed by the processor, cause the processor to execute the method according to claim 1.

10. A non-transitory computer-readable storage medium having a computer program stored thereon, which, when executed by a processor, implements the method according to claim 1.

* * * * *